US009947098B2

(12) United States Patent
Romano et al.

(10) Patent No.: US 9,947,098 B2
(45) Date of Patent: Apr. 17, 2018

(54) AUGMENTING A DEPTH MAP REPRESENTATION WITH A REFLECTIVITY MAP REPRESENTATION

(71) Applicant: Facebook, Inc., Menlo Park, CA (US)

(72) Inventors: Nitay Romano, Geva Binyamin (IL); Nadav Grossinger, Karmei Yosef (IL)

(73) Assignee: Facebook, Inc., Menlo Park, CA (US)

( * ) Notice: Subject to any disclaimer, the term of this patent is extended or adjusted under 35 U.S.C. 154(b) by 43 days.

(21) Appl. No.: 15/153,741

(22) Filed: May 13, 2016

(65) Prior Publication Data
US 2016/0335773 A1 Nov. 17, 2016

Related U.S. Application Data

(60) Provisional application No. 62/160,957, filed on May 13, 2015.

(51) Int. Cl.
G06T 7/521 (2017.01)
G06T 7/00 (2017.01)
G06T 15/50 (2011.01)

(52) U.S. Cl.
CPC ............ *G06T 7/0057* (2013.01); *G06T 7/521* (2017.01); *G06T 15/50* (2013.01); *G06T 2200/04* (2013.01); *G06T 2200/08* (2013.01); *G06T 2207/10024* (2013.01); *G06T 2207/30201* (2013.01)

(58) Field of Classification Search
CPC .................................................. G06T 7/521
See application file for complete search history.

(56) References Cited

U.S. PATENT DOCUMENTS 5,878,152 A * 3/1999 Sussman ............ G01B 11/2513
382/106
6,674,893 B1 * 1/2004 Abe .................... G01B 11/2527
356/610
6,754,370 B1 * 6/2004 Hall-Holt ............... G01B 11/25
356/3

(Continued)

OTHER PUBLICATIONS

PCT International Search Report and Written Opinion, PCT Application No. PCT/US2016/032230, dated Aug. 22, 2016, 11 pages.

Primary Examiner — Barry Drennan
Assistant Examiner — Phong Nguyen
(74) Attorney, Agent, or Firm — Fenwick & West LLP

(57) ABSTRACT

A solution for generating a 3D representation of an object in a scene is provided. A depth map representation of the object is combined with a reflectivity map representation of the object to generate the 3D representation of the object. The 3D representation of the object provides more complete and accurate information of the object. An image of the object is illuminated by structured light and is captured. Pattern features rendered in the captured image of the object are analyzed to derive a depth map representation and a reflectivity map representation of the illuminated object. The depth map representation provides depth information while the reflectivity map representation provides surface information (e.g., reflectivity) of the illuminated object. The 3D representation of the object can be enhanced with additional illumination projected onto the object and additional images of the object.

20 Claims, 13 Drawing Sheets

(56) References Cited

U.S. PATENT DOCUMENTS

| | | | |
|---|---|---|---|
| 2004/0143786 A1* | 7/2004 | Stauder | G06T 15/50 715/202 |
| 2005/0219552 A1* | 10/2005 | Ackerman | A61B 1/042 356/603 |
| 2006/0120593 A1 | 6/2006 | Oshino | |
| 2008/0123937 A1* | 5/2008 | Arias Estrada | G06T 7/85 382/154 |
| 2008/0309662 A1 | 12/2008 | Hassner et al. | |
| 2009/0096783 A1* | 4/2009 | Shpunt | G01B 11/25 345/419 |
| 2009/0189858 A1* | 7/2009 | Lev | G06F 3/017 345/158 |
| 2009/0322745 A1* | 12/2009 | Zhang | G06T 7/521 345/420 |
| 2010/0079581 A1* | 4/2010 | Russell | H04N 13/0253 348/46 |
| 2010/0201811 A1* | 8/2010 | Garcia | G01B 11/2513 348/136 |
| 2011/0025827 A1* | 2/2011 | Shpunt | H04N 13/0239 348/47 |
| 2011/0050859 A1* | 3/2011 | Kimmel | G01B 11/2509 348/50 |
| 2011/0057930 A1* | 3/2011 | Keller | G06T 15/205 345/419 |
| 2011/0158508 A1* | 6/2011 | Shpunt | G01B 11/25 382/154 |
| 2012/0056988 A1* | 3/2012 | Stanhill | H04N 13/0253 348/46 |
| 2012/0201424 A1* | 8/2012 | Masalkar | G06F 3/005 382/106 |
| 2013/0342651 A1* | 12/2013 | Zatloukal | G06K 19/06159 348/46 |
| 2014/0098018 A1* | 4/2014 | Kim | G06F 3/014 345/156 |
| 2014/0132722 A1* | 5/2014 | Martinez Bauza | G01B 11/25 348/46 |
| 2014/0240467 A1* | 8/2014 | Petyushko | H04N 13/0022 348/47 |
| 2014/0268160 A1* | 9/2014 | Debevec | G01N 21/55 356/445 |
| 2015/0042680 A1* | 2/2015 | Grossinger | G06T 19/006 345/633 |
| 2015/0043806 A1* | 2/2015 | Karsch | G06T 15/50 382/154 |
| 2015/0092016 A1* | 4/2015 | Chen | G01B 11/25 348/46 |
| 2015/0302648 A1* | 10/2015 | Zhang | G01B 11/2513 345/426 |
| 2016/0063309 A1* | 3/2016 | Konolige | G06K 9/00201 382/153 |
| 2016/0076878 A1* | 3/2016 | Tin | G01B 11/22 348/135 |
| 2016/0182789 A1* | 6/2016 | Wan | H04N 5/2256 348/370 |
| 2016/0255332 A1* | 9/2016 | Nash | G06F 11/10 348/46 |
| 2016/0324580 A1* | 11/2016 | Esterberg | A61B 34/10 |

* cited by examiner

AUGMENTING A DEPTH MAP REPRESENTATION WITH A REFLECTIVITY MAP REPRESENTATION

CROSS-REFERENCE TO RELATED APPLICATIONS

This application claims the benefit of U.S. Provisional Patent Application No. 62/160,957, filed May 13, 2015, the disclosure of which is hereby incorporated by reference in its entirety.

BACKGROUND

This disclosure relates generally to the field of structured light imaging, and more specifically to enhancing 3 dimensional (3D) representations of objects with reflectivity map representation of the objects.

3D representations of scenes or objects in scenes are used to render images for a Virtual Reality (VR) system, which provides virtual experience to users of the VR system. However, using only depth map representation of an object in conventional ways to create 3D representations of the object has drawbacks. For example, using only depth information of captured objects in a scene for a 3D representation of the scene does not provide detailed information of the surfaces of the objects, which degrades user experience with the effect of 3D scenes generated from the depth map representations of the captured objects.

SUMMARY

Embodiments of a disclosed invention include a system (or a computer implemented method or a non-transitory computer readable medium) for augmenting a depth map representation of an object with a reflectivity map representation of the object to generate a three dimensional (3D) representation of the object. An "object" refers to any target of a digital image, including any number of particular elements and/or background of the image. An object can be the whole image or a specific element within a scene captured by the image. A "3D representation" of an object refers to a stereoscopic representation of the object that appears more realistic compared with a two dimensional (2D) image. A "depth map representation" of an object refers to an image that contains information about distances of different parts of the surface of the object from a designated viewpoint (e.g., position of a sensor that captures images of the object). A depth map representation of an object may be in the form of a mesh connecting all dots with Z-axis data, and the Z-axis measures distances from the object to the designated viewpoint. A "reflectivity map representation" of an object refers to an image that contains information about reflectivity on different parts of the surface of the object, and a reflectivity map representation provides more fine-scale details of the surface of the object in comparison with the depth map representation of the object.

An embodiment of the method comprises operations of capturing an image of an object in a scene that is illuminated by structured light. The "structured light" refers to a light of a specific non-uniform illumination pattern that is projected onto the object. The captured image includes pattern features (e.g., stripes in one dimension) that result from the illumination pattern. The "pattern features" or "patterns" refer to specific forms or shapes (e.g., lines, stripes, dots and specific geometric shapes) produced by a non-uniform illumination, e.g., a particularly structured illumination. Multiple pattern features can have uniform or different characteristics (e.g., shape, size and/or intensity). The pattern features are analyzed to derive a depth map representation of the captured object in the scene by modelling information derived from geometric deformation of the pattern features. The pattern features are also analyzed to derive a reflectivity map representation by obtaining information about reflectivity characteristics of the object. For example, the pattern features of the object in the scene are first indexed according to their feature characteristics (e.g., intensity, color, shape), and functional behaviors of the pattern features are then derived. After the functional behavior is derived, the pattern features are removed from the captured image and a reflectivity map representation of the object is created. The created depth map representation and the reflectivity map representation are combined to generate a three dimensional (3D) representation of the object. The 3D representation of the object also reflects both surface details provided by the reflectivity map representation of the object and depth information provided by the depth map representation of the object. The process of combining a depth map representation of an object with a reflectivity map representation of the object is also referred to as augmenting the depth map representation of the object with the reflectivity map representation of the object.

In some embodiments, additional illumination may be provided to improve derivation of the reflectivity map representation of the object, and additional images of the object may be captured. The reflectivity map representation of the object registers the additional images onto the depth map representation of the object to derive additional 3D data. An enhanced 3D representation of the object is generated based on the derived additional 3D data. In some embodiments, the 3D representations of the object are used to provide virtual scenes of the object in a VR system. A user wearing a VR headset may experience virtual scenes of the object provided by the augmented depth map representation of the object.

3, removal of the pattern features and residual signal from the pattern features removal, according to one embodiment.

Figure 3:
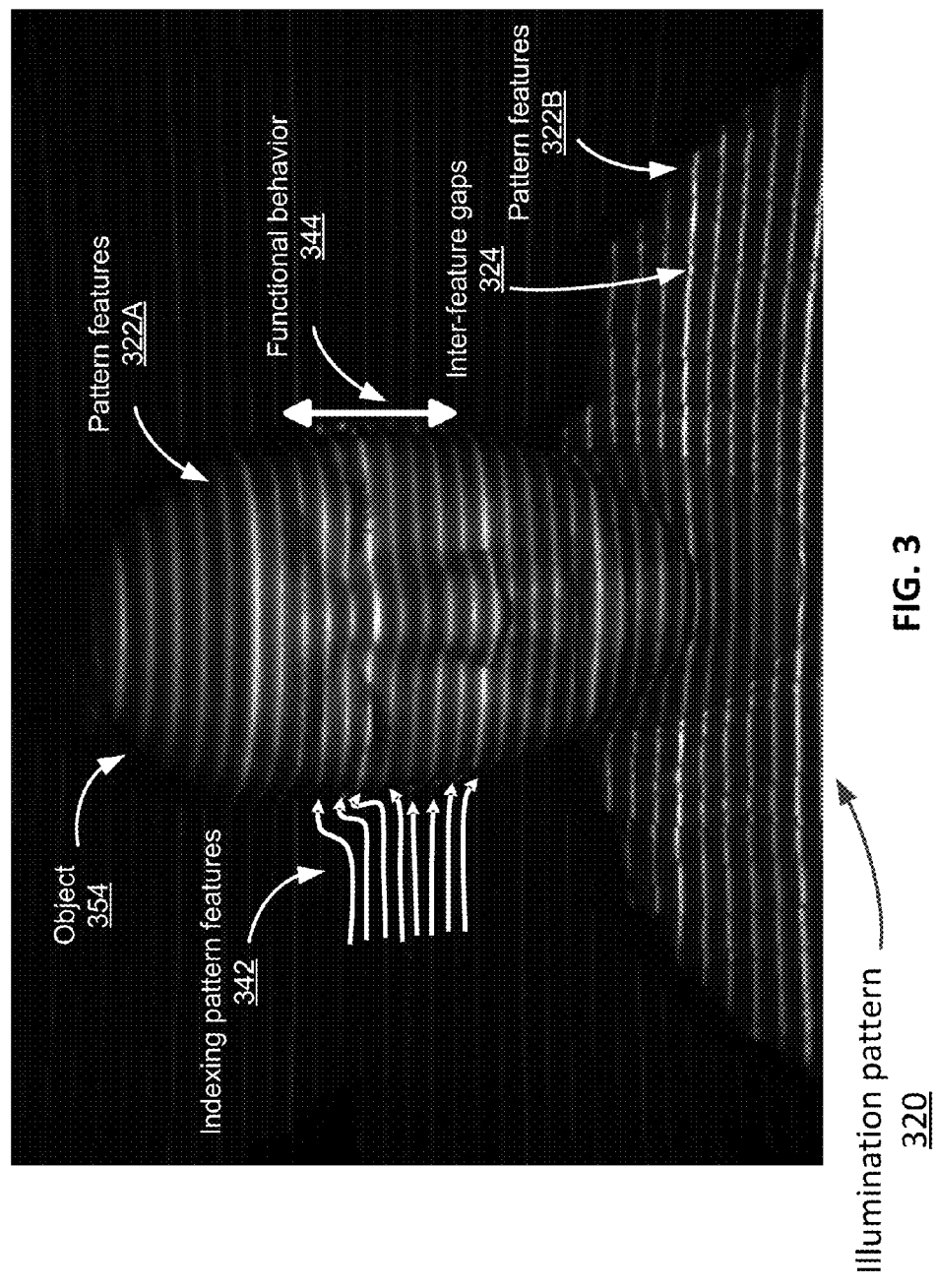
FIG. 3 is an example captured image of an object that is illuminated by structured light with a specific illumination pattern, according to one embodiment.
Figures 6A, 6B:
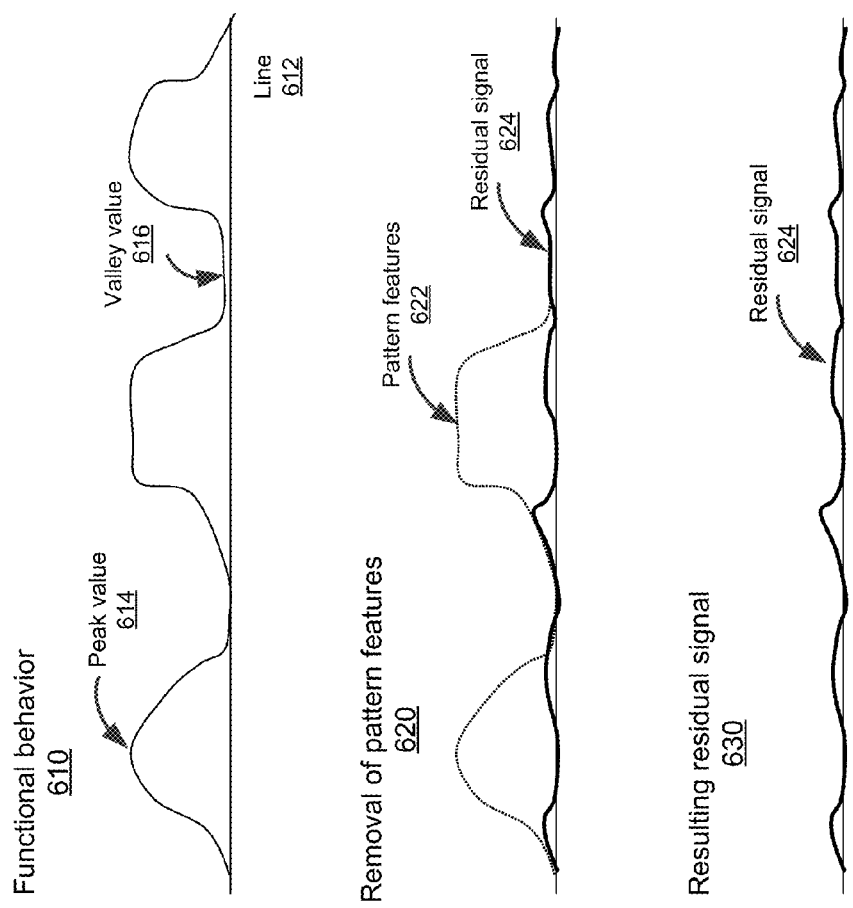
FIG. 6A shows examples of functional behavior of pattern features of the object in the captured image shown in FIG.

FIG. 6B shows an illuminated signal of the object in the captured image shown in FIG. 3 and a multiplication function that is used to remove the pattern features on the surface of the object, according to one embodiment.

Figure 6C:
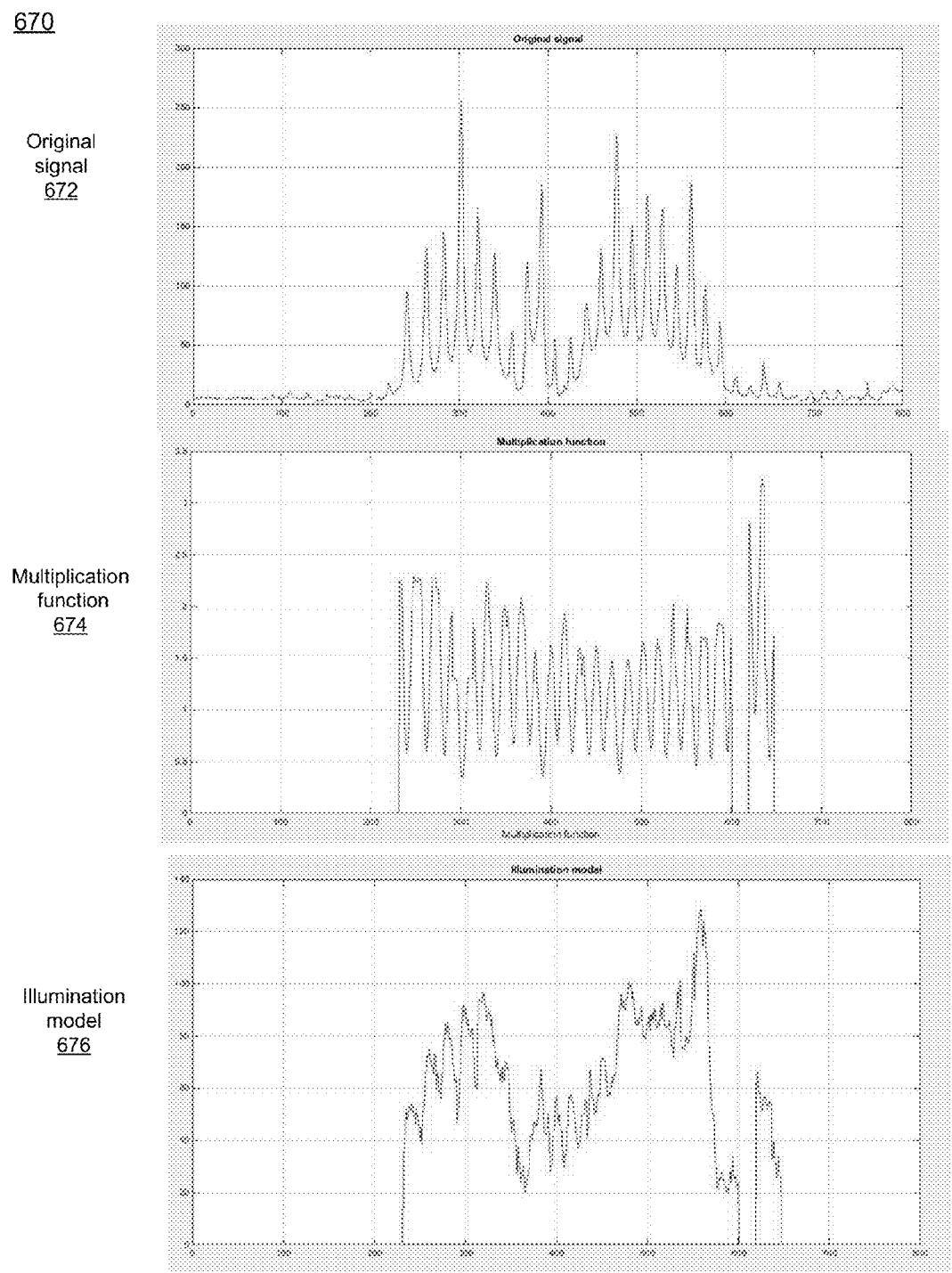

FIG. 6C shows another example of an original signal, a multiplication function, and an illumination model for generating a reflectivity map representation of an object in a captured image, according to one embodiment.

Figure 4:
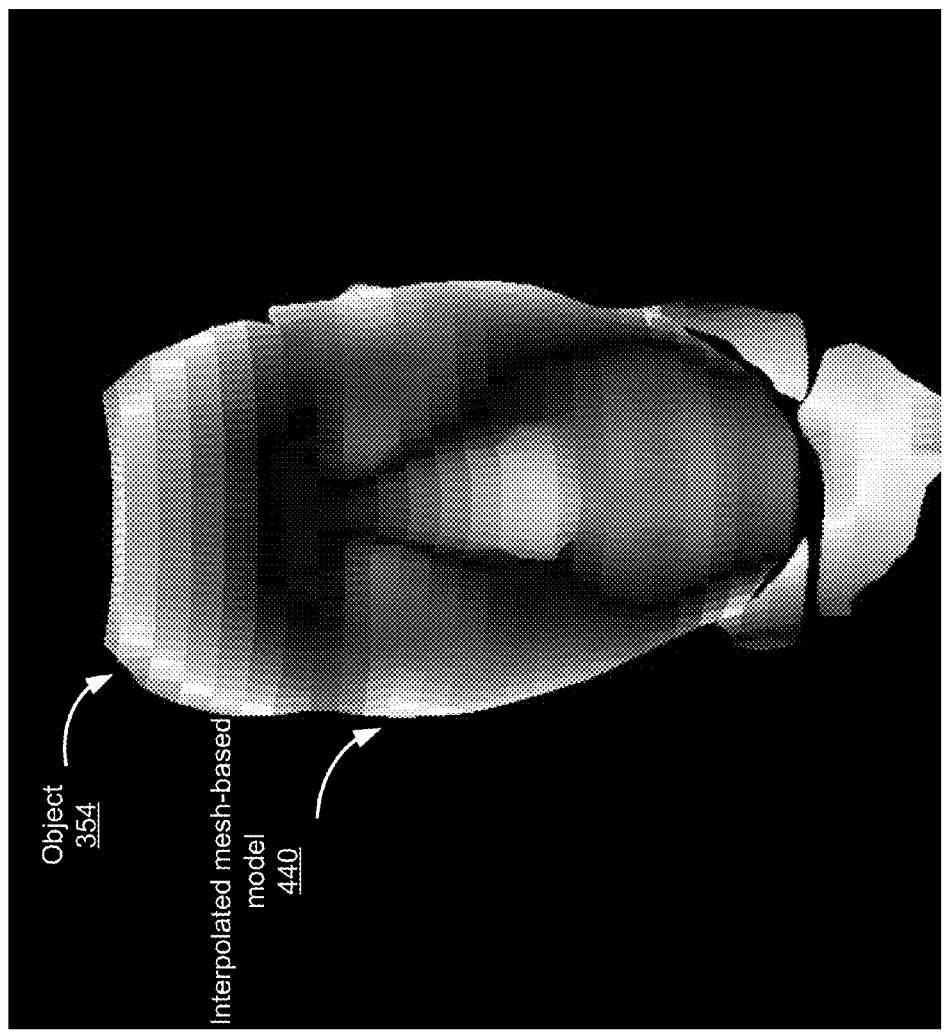
FIG. 4 is an example depth map representation of the object in the captured image shown in FIG. 3, according to one embodiment.
Figure 5:
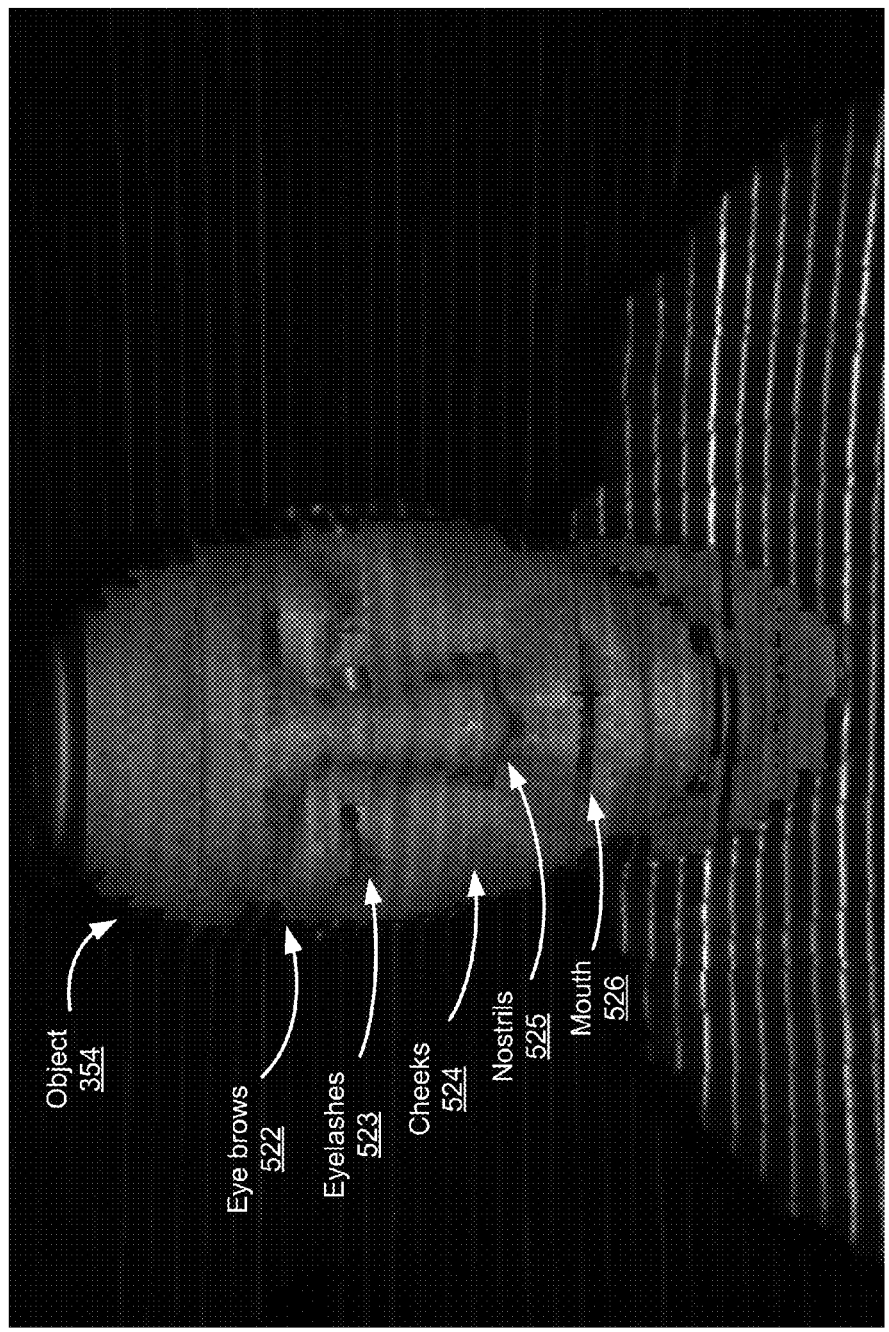
FIG. 5 is an example reflectivity map representation of the object in the captured image shown in FIG. 3, according to one embodiment.
Figure 7:
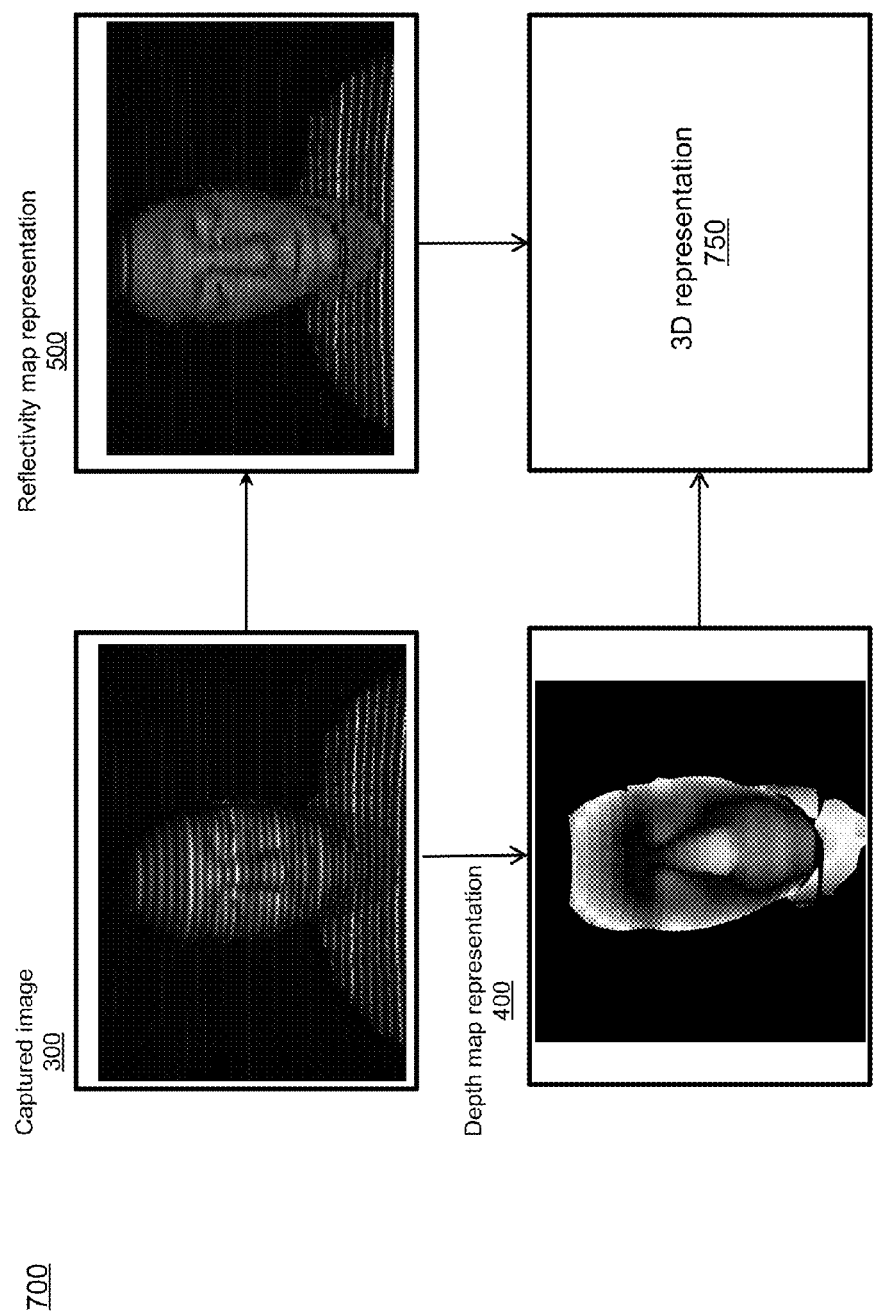

FIG. 7 is a flow diagram illustrating generation of a 3D representation of the object shown in FIG. 3 by combining the depth map representation shown in FIG. 4 and reflectivity map representation shown in FIG. 5, according to one embodiment.

Figure 8A:
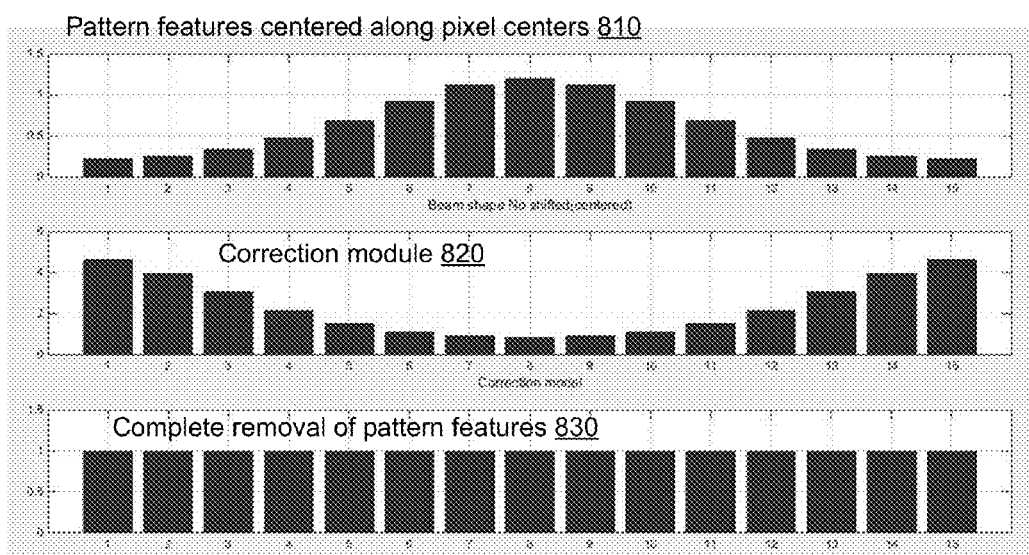

FIG. 8A shows an example of effect of relative positions between pattern features and pixels of an object in an image capturing the object, according to one embodiment.

Figure 8B:
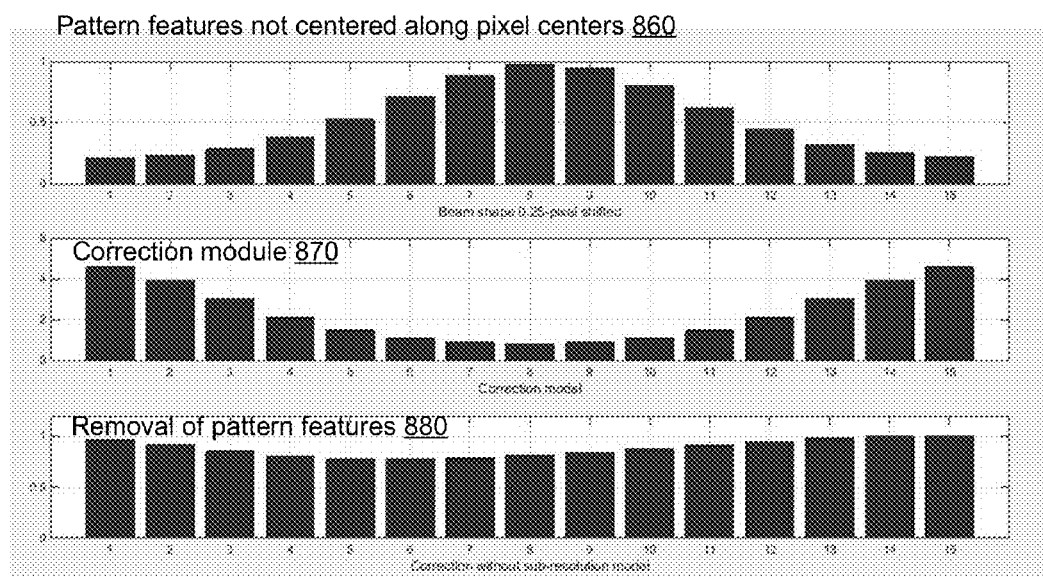
Figure 9A:
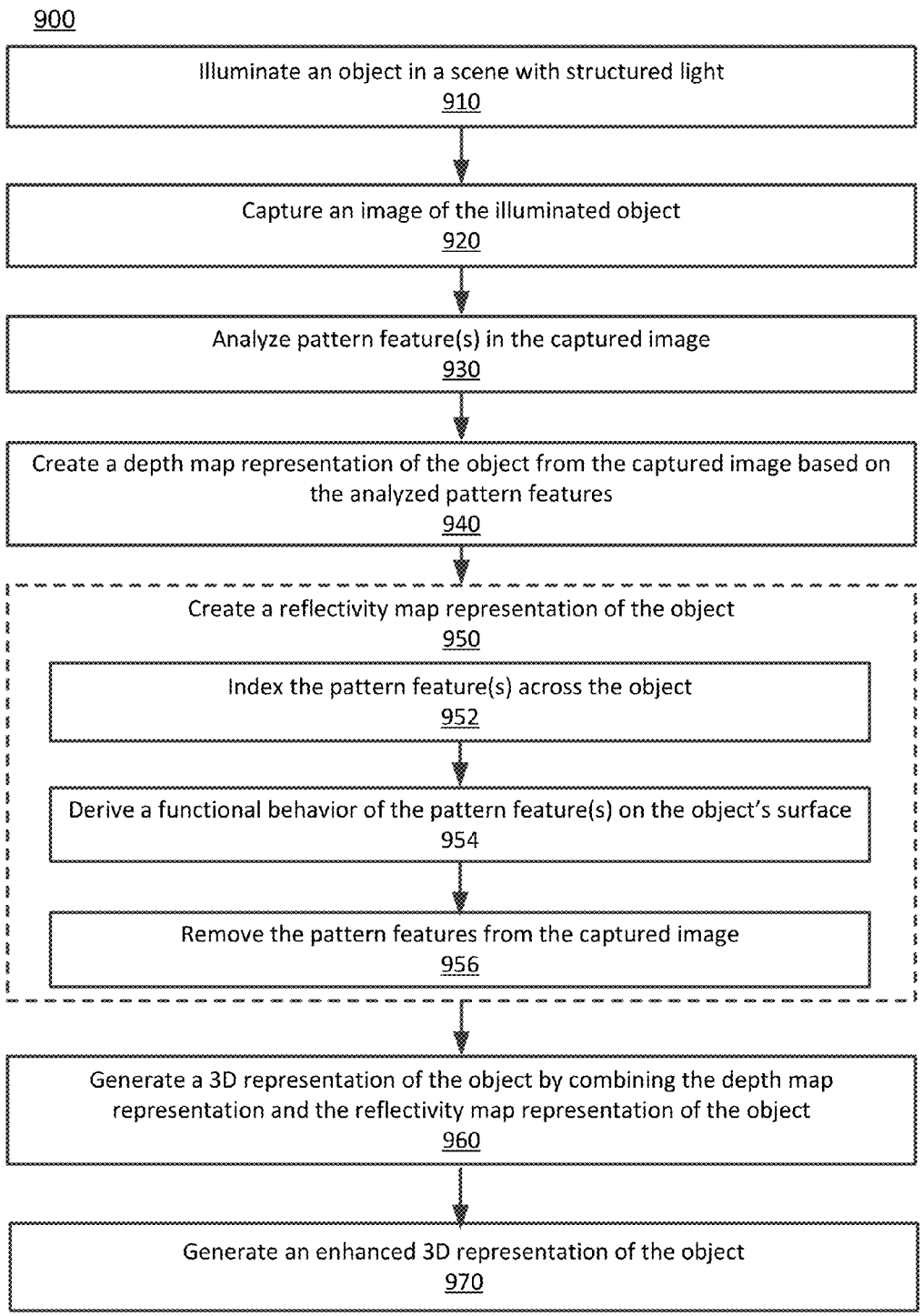

FIG. 8B shows another example of effect of relative positions between pattern features and pixels of an object in an image capturing the object, according to one embodiment FIG. 9A is an example flowchart illustrating a process of generating by the processor a 3D representation of an object in an image capturing the object by augmenting a depth map representation of an object with a reflectivity map representation of the object, according to one embodiment.

Figure 9B:
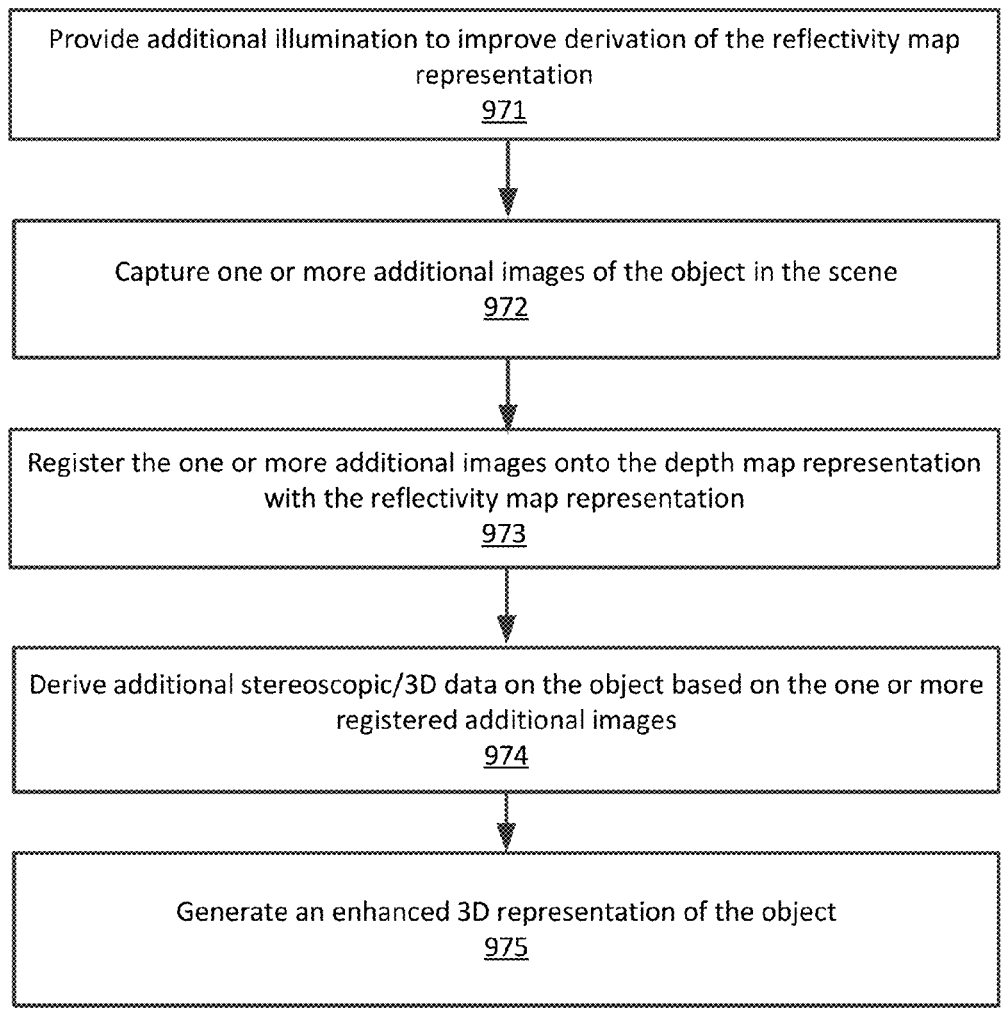

FIG. 9B is an example flowchart illustrating a process of generating an enhanced 3D representation based on the process shown in FIG. 9A, according to one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED FIGURE DESCRIPTION

Figure 1A:
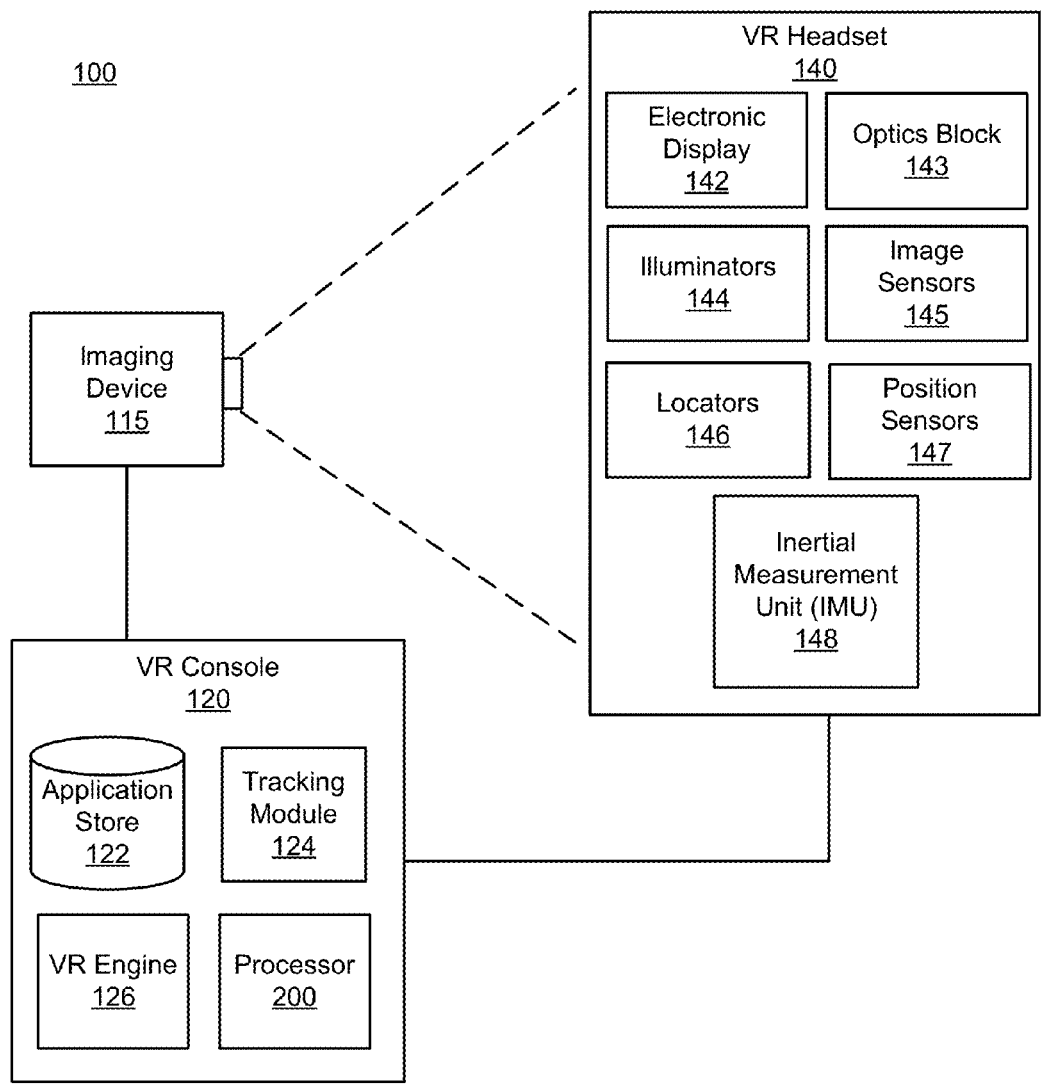
FIG. 1A is a block diagram of a system environment including a virtual reality (VR) system to provide virtual scenes of an object using 3D representations of the object, according to one embodiment.

FIG. 1A is a block diagram of a system environment including a virtual reality (VR) system 100, according to one embodiment. The VR system 100 includes a VR headset 140, and an imaging device 115, each of which is coupled to the VR console 120. For simplicity, only one VR headset 140, one imaging device 115, and one VR console 120 are shown in the VR system 100. In alternative embodiments not shown, the VR system 100 can include multiple VR headsets 140, imaging devices 115, VR consoles 120 and additional or different components. Likewise, functions performed by the various entities included in the VR system 100 may differ in different embodiments.

The VR headset 140 is a head-mounted display (HMD) that presents media to a user. Examples of media presented by the VR headset 140 include one or more images, video, audio, or some combination thereof. In some embodiments, the VR headset 140 may also act as an augmented reality (AR) and/or mixed reality (MR) headset. In these embodiments, the VR headset 140 augments views of a physical, real-world environment with computer-generated elements (e.g., images, video, sound, etc.) such as supplementing the physical, real-world environment by computer-generated sensory input such as sound, video, graphics data. In the embodiment illustrated in FIG. 1A, the VR headset 140 includes an electronic display 142, an optics block 143, one or more illuminators 144, one or more image sensors 145, one or more locators 146, one or more position sensors 147, and an inertial measurement unit (IMU) 148.

The electronic display 142 and the optics block 143 together monitors image light that is presented to eyes of a user wearing the VR headset 140. More specifically, the electronic display 142 provides an original image light. The optics block 143 magnifies the received image light from the electronic display 142, corrects optical errors associated with the received image light, and the corrected image light is presented to a user of the VR headset 140. The optics block 143 may have one or more optical elements. An optical element may be an aperture, a Fresnel lens, a convex lens, a concave lens, a filter, or any other suitable optical element that affects the image light emitted from the electronic display 142. Moreover, the optics block 143 may include combinations of different optical elements. In some embodiments, one or more of the optical elements in the optics block 143 may have one or more coatings, such as anti-reflective coatings.

The illuminators 144 provide illumination to illuminate an object in a scene. In one embodiment, the illuminators 144 provide structured light to illuminate an object. "Structured light" refers to light provided by one or more illuminators 144 that projects a known illumination pattern of pixels onto the illuminated object or scene. Example illuminators 144 can be a laser transmitter and an infra-red (IR) pattern illuminator.

The image sensors 145 capture images of an object or a scene illuminated by an illuminator 144. An image sensor 145 included in the VR headset 140 can be a monochromatic sensor in a visual range, a red-green-blue (RGB) sensor or an IR sensor. An example image sensor 145 can be an IR camera or a red-green-blue (RGB) camera.

The locators 146 locate objects located in specific positions on the VR headset 140 relative to one another and relative to a specific reference point on the VR headset 140. A locator 146 may be a light emitting diode (LED), a corner cube reflector, a reflective marker, a type of light source that contrasts with an environment in which the VR headset 140 operates, or some combination thereof. In embodiments where the locators 146 are active (i.e., an LED or other type of light emitting device), the locators 146 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 146 are located beneath an outer surface of the VR headset 140, which is transparent to the wavelengths of light emitted or reflected by the locators 146 or is thin enough to not substantially attenuate the wavelengths of light emitted or reflected by the locators 146. Additionally, in some embodiments, the outer surface or other portions of the VR headset 140 are opaque in the visible band of wavelengths of light. Thus, the locators 146 may emit light in the IR band under an outer surface that is transparent in the IR band but opaque in the visible band.

The IMU 148 is an electronic device that generates calibration data based on measurement signals received from one or more of the position sensors 147. A position sensor 147 generates one or more measurement signals in response to motion of the VR headset 140. Examples of position sensors 147 include: one or more accelerometers, one or more gyroscopes, one or more magnetometers, another suitable type of sensor that detects motion, a type of sensor used for error correction of the IMU 148, or some combination thereof. The position sensors 147 may be located external to the IMU 148, internal to the IMU 148, or some combination thereof.

Based on the one or more measurement signals from one or more position sensors 147, the IMU 148 generates calibration data indicating an estimated position of the VR headset 140 relative to an initial position of the VR headset 140. For example, the position sensors 147 include multiple accelerometers to measure translational motion (e.g., forward/back, up/down, left/right) and multiple gyroscopes to measure rotational motion (e.g., pitch, yaw, roll). In some embodiments, the IMU 148 samples the measurement signals and calculates the estimated position of the VR headset 140 from the sampled data. For example, the IMU 148 integrates the measurement signals received from the accelerometers over time to estimate a velocity vector of the VR headset 140 and integrates the velocity vector over time to determine an estimated position of a reference point on the VR headset 140. Alternatively, the IMU 148 provides the sampled measurement signals to the VR console 120, which determines the calibration data. The reference point is a point that may be used to describe the position of the VR headset 140. While the reference point may generally be defined as a point in space, in one embodiment, the reference point is defined as a point within the VR headset 140 (e.g., a center of the IMU 148).

The IMU 148 receives one or more calibration parameters from the VR console 120 to track the operations of the VR headset 140. Based on a received calibration parameter, the IMU 148 may adjust one or more IMU parameters (e.g., sample rate). In some embodiments, certain calibration parameters cause the IMU 148 to update an initial position of the reference point of the VR headset 140 so that the VR headset 140 corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 115 generates calibration data in accordance with calibration parameters received from the VR console 120. Examples of calibration data include one or more images showing observed positions of the locators 146 detected by the imaging device 115. The imaging device 115 may include one or more cameras, one or more video cameras, any other device capable of capturing images, or some combination thereof. Additionally, the imaging device 115 may include one or more filters (e.g., used to increase signal to noise ratio of an image captured by the imaging device 115). The imaging device 115 is designed to detect light emitted or reflected from locators 146 in a field of view of the imaging device 115. In embodiments where the locators 146 include passive elements (e.g., a retroreflector), the imaging device 115 may include a light source that illuminates some or all of the locators 146, which retro-reflect the light towards the light source in the imaging device 115. The calibration data is communicated from the imaging device 115 to the VR console 120, and the imaging device 115 receives one or more calibration parameters from the VR console 120 to adjust one or more imaging parameters (e.g., focal length, focus, frame rate, ISO, sensor temperature, shutter speed, aperture, etc.).

The VR console 120 provides media to the VR headset 140 for presentation to a user in accordance with information received from one or both of: the imaging device 115, and the VR headset 140. In the example shown in FIG. 1A, the VR console 120 includes an application store 122, a tracking module 124, a virtual reality (VR) engine 126, and a processor 200. Some embodiments of the VR console 120 have different modules than those described in conjunction with FIG. 1A. Similarly, the functions further described below may be distributed among components of the VR console 120 in a different manner than described here.

The application store 122 stores one or more applications for execution by the VR console 120. An application is a group of instructions (e.g., executable computer program instructions), that when executed by a processor (e.g., a computer processor), generates content for presentation to the user. Content generated by an application may be in response to inputs received from the user via movement of the VR headset 140. Examples of applications include: gaming applications, conferencing applications, video playback application, or other suitable applications.

The tracking module 124 calibrates the VR system 100 using one or more calibration parameters and may adjust one or more calibration parameters to reduce error in determination of the position of the VR headset 140. For example, the tracking module 124 adjusts the focus of the imaging device 115 to obtain a more accurate position for observed locators on the VR headset 140. Moreover, calibration performed by the tracking module 124 also accounts for information received from the IMU 148. Additionally, if tracking of the VR headset 140 is lost (e.g., the imaging device 115 loses line of sight of at least a threshold number of the locators 148), the tracking module 124 re-calibrates some or all of the VR system 100.

The tracking module 124 tracks movements of the VR headset 140 using calibration information received from the imaging device 115. The tracking module 124 determines positions of a reference point of the VR headset 140 using observed locators from the calibration information. The tracking module 124 also determines positions of a reference point of the VR headset 140 using position information received from the IMU 148. Additionally, in some embodiments, the tracking module 124 may use portions of the calibration information from the VR console 120, the calibration information from the imaging device 115, or some combination thereof, to predict a future location of the VR headset 140. The tracking module 124 provides the estimated or predicted future position of the VR headset 140 to the VR engine 126.

The VR engine 126 executes applications within the VR system 100 and receives position information, acceleration information, velocity information, predicted future positions, or some combination thereof of the VR headset 140 from the tracking module 124. Based on the received information, the VR engine 126 determines content to provide to the VR headset 140 for presentation to the user. For example, if the received information indicates that the user has looked to the left, the VR engine 126 generates content for the VR headset 140 that mirrors the user's movement in a virtual environment.

The processor 200 processes information received from the imaging device 115 and/or from the VR headset 140. In some embodiments, the processor 200 receives images and related image data from the imaging device 115, generates one or more virtual scenes of the received images, and presents the generated virtual scenes to the VR headset 140 for presentation to a user of the VR headset 140. For example, the processor 200 receives from the imaging device 115 a captured image of an object in a scene that is illuminated with structured light, and analyzes one or more pattern features of the captured image. The processor 200 creates a depth map representation of the object in the scene and a reflectivity map representation of the object from the captured image based on the analyzed pattern features, and generates a 3D representation of the object by combining the depth map representation of the object and the reflectivity map representation of the object, as more fully described below in FIG. 2A-2B.

Figure 1B:
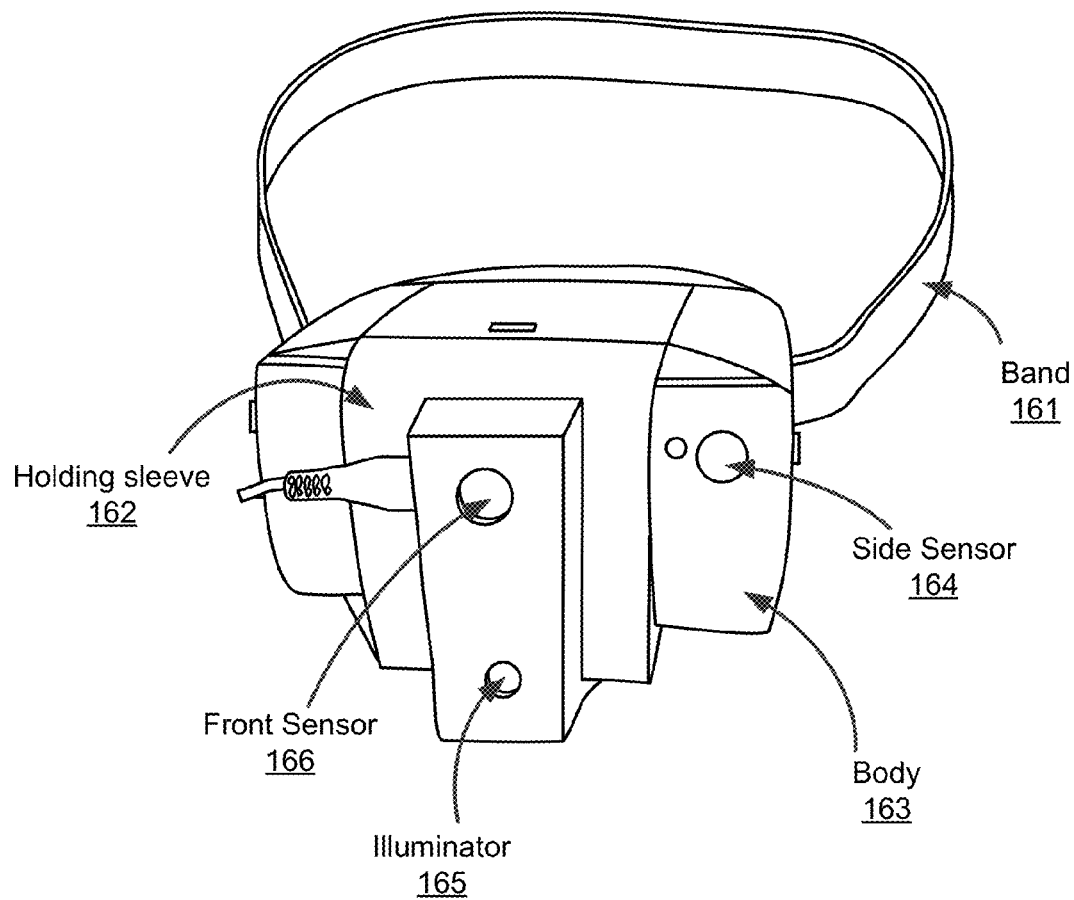
FIG. 1B is a perspective view of an example VR headset operating in the VR system shown in FIG. 1A, according to one embodiment.

FIG. 1B is a perspective view of an example VR headset 160 operating in the VR system 100 shown in FIG. 1A, according to one embodiment. In FIG. 1B, the VR headset 160 includes a band 161, a holding sleeve 162 which holds a body 163 of the VR headset 160, an illuminator 165, a side sensor 164, and a front sensor 166. Only one band 161, one holding sleeve 162, one illuminator 165, one front sensor 166 and one side sensor 164 are shown in FIG. 1B for purposes of illustration. In alternative embodiments not shown, the VR headset 160 may include multiple bands 161, holding sleeves 162, illuminators 165, front sensors 166, side sensors 166 and additional or different components. Additionally, functions performed by various entities in the VR headset 160 may differ in different embodiments. In some embodiments, the VR headset 160 illustrated in FIG. 1B is same or similar to the VR headset 140 in the VR system 100 shown in FIG. 1A.

The illuminator 165 illuminates a scene or an object in a scene. In some embodiments, the illuminator 165 provides structured light that has a specific illumination pattern, where the object or the scene illuminated by the illuminator renders specific patterns based on the structured light. The processor 200 (shown in FIG. 1A) may control the illuminator 165 to provide structured light with different illumination patterns at different times. For simplicity, only one illuminator 165 is shown in FIG. 1B. In alternative embodiments not shown, the VR headset 160 can include additional illuminators with different types. For example, the VR headset 160 includes an additional illuminator (not shown here) to provide additional illumination to the object in the scene. In some embodiments, the illuminator 165 shown in FIG. 1B is same or similar to the illuminator 144 in the VR system 100 shown in FIG. 1A.

The front sensor 166 and the side sensor 164 capture images of an object or a scene in front of the VR headset 160 from different perspectives. In one embodiment, the front sensor 166 can be the main sensor of the VR headset 160 and the side sensor 164 functions as an additional sensor to capture additional images of the object. Both the front sensor 166 and the side sensor 164 can be an infrared sensor, an RGB sensor or a monochromatic sensor. For simplicity, only one front sensor 166 and one side sensor 164 are shown in FIG. 1B. In alternative embodiments not shown, the VR headset 160 may include a different number of sensors with different types and/or that are positioned in different places on the VR headset. Likewise, the additional sensor(s) may be sensors with different types. In some embodiments, the front sensor 166 and the side sensor 164 are same or similar to the image sensors 145 in the VR system 100 shown in FIG. 1A.

Figure 2A:
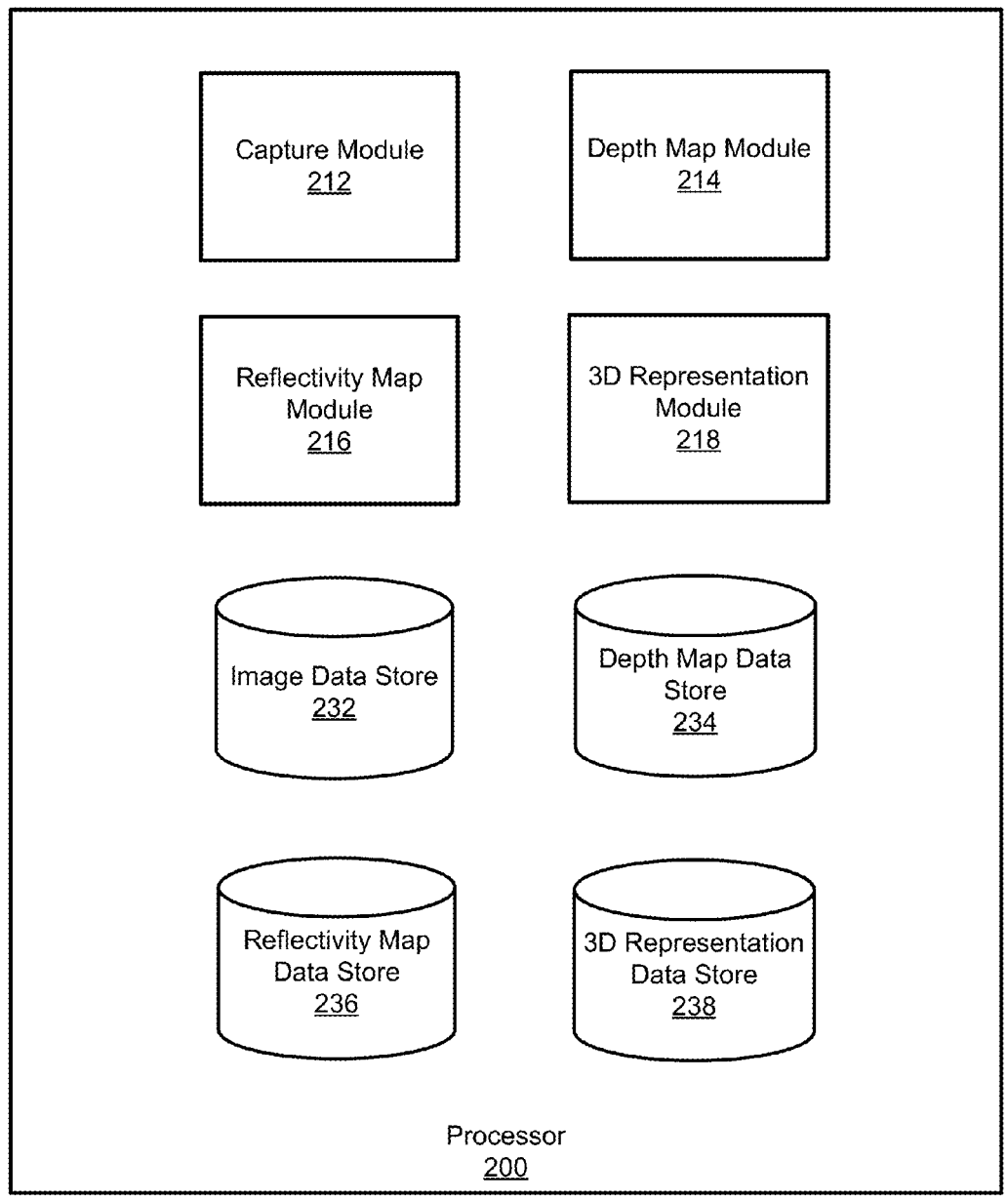
FIG. 2A is a block diagram of a processor operating in the VR system shown in FIG. 1A, according to one embodiment.

FIG. 2A is a block diagram of the processor 200 operating in the VR system shown 100 in FIG. 1A, according to one embodiment. In the example shown in FIG. 2A, the processor 200 includes a capture module 212, a depth map module 214, a reflectivity map module 216, a 3D representation module 218, an image data store 232, a depth map data store 234, a reflectivity map data store 236, and a 3D representation data store 238. In alternative embodiments not shown, the processor 200 can include additional and/or different modules or data stores. Likewise, functions performed by various entities of the processor 200 may differ in different embodiments.

The capture module 212 captures images of a scene or an object in a scene. In one embodiment, the processor 200 instructs one or more sensors (e.g., front sensor 166, side sensor 164 shown in FIG. 1B) to capture images of an object in a scene or the scene itself. As one example, the capture module 212 may capture an original image of an object that is used to create a depth map representation of the object and a reflectivity map representation of the object. As another example, the capture module 212 may capture one or more additional images of the same object to enhance a created 3D representation of the object. The additional images may be captured from a same perspective or a different perspective compared with the original image, by a same sensor or a different sensor. As a further example, the capture module 212 may capture images of different objects or different scenes.

In one embodiment, the capture module 212 captures images of the object illuminated by an illuminator that projects structured light with a specific illumination pattern onto the object. The captured image of the object provides more useful information for future generation of reflectivity map representation compared with an image of the same object illuminated with normal light with no illumination patterns (e.g., uniform illumination). The captured image of the object illuminated with the structured light includes specific pattern features that correspond to the illumination patterns projected onto the object. The pattern features can be stripes, lines, dots or other geometric shapes, and includes uniform or non-uniform characteristics such as shape, size and intensity. An example captured image illuminated with specific structured light is described below in FIG. 3. The captured images and related image data (e.g., intensity, depth and gradient of each pixel) are stored in the image data store 232, as more fully described below.

The depth map module 214 retrieves the captured image of the illuminated object from the image data store 232 and generates a depth map representation of the object from the captured image of the illuminated object. As described above, a depth map representation of an object refers to an image containing information about distances of different parts of the surface of the object from a designated viewpoint, and the designated viewpoint can be the position of a sensor that captures the image of the object. An example depth map representation is further described below with reference to FIG. 4. The generated depth map representations of the object and related depth data are stored in the depth map data store 234, as more fully described below.

In one embodiment, the depth map module 214 identifies and analyzes pattern features for deriving depth information of the captured image. Based on the identified and analyzed pattern features associated with the object, the depth map module 214 generates a depth map representation of the object. Examples of the depth information may be geometric deformation of the object due to differences of depth of each pixel on the object in the captured image. The "depth" of a pixel on the object refers to the distance between the pixel on the actual object and the designated viewpoint (e.g., the position of the sensor).

In some embodiments, the depth map module 214 generates a depth map representation of the object in the captured image based on a correlation between a detected pattern in the captured image and a reference pattern. A detected pattern refers to a pattern that is projected onto the object and rendered in the captured image, and a reference pattern refers to the original illumination pattern provided by the illuminator. For structured light having an illumination pattern that is projected unto an object, the pattern that is detected in the captured image of the object is a distorted version of the original illumination pattern of the structured light. The distorted version of the original pattern includes shifts and other distortions due to depth of the object. By comparing the detected pattern with the original illumination pattern, or parts of the detected pattern with the corresponding parts of the original illumination pattern, the depth map module 214 identifies the shifts or distortions and generates a depth map representation of the object.

In one embodiment, the correlation between the detected pattern and the reference pattern is obtained using a sequence of adjusted features of the pattern features detected in the captured image. For example, the pattern features rendered on the captured image are individualized to aid with correlation between the detected pattern and the reference pattern. In one embodiment, the correlation is based on the comparison of the individualized pattern features of the overall detected pattern with corresponding pattern features of the reference pattern. In another embodiment, the correlation is based on the individualized features of parts of the detected pattern with features of the corresponding parts of the reference pattern. The correlation allows depth information of individual pixels of the object in the captured image to be derived.

The depth map module 214 may also generates a depth map representation of the object in the captured image based on application of one or more different variations to an illumination pattern in orthogonal directions. The variations to an illumination pattern allow the depth map module 214 to unambiguously identify specific pattern features detected in the captured image of the object. As one example, the variations of an illumination pattern may be intensity variations (e.g. stripes illustrated in FIG. 3) and may provide unique signatures to each part of the pattern features that result from the illumination pattern. As another example, the variations may be cyclic (but not in phase) to provide maximal unique identification using minimal computing resources. Additionally, the depth map module 214 may use two or more different types of variations. The different types of variations can be measured against each other to provide depth information of pixels located at different places of the object in the captured image.

As one example, if using one intensity variation of pattern features (e.g., stripes with varying intensities), the depth map module 214 applies a unique signature (e.g. a cyclically unique signature) to each stripe in a designated dimension (e.g., a direction aligned with Y axis in a same coordinate system shared with the captured image). The depth map module 214 generates a depth map representation of the object in the captured image based on the shifts of each stripe from a designated base position. In order to accurately detect the shifts, the depth map module 214 may identify each individual line of pixels of the object in the captured image by assigning a cyclically unique signature to each individual line, and achieves identification based on the unique signature associated with each line. In this example, the intensity variation includes stripes of different intensity in one dimension, and the detected stripes may render different detection effects, for example, some stripes may be weak, some may be medium and some may be strong. The detected pattern may have a single location where the weak, medium and strong stripes coincide in a given order (e.g., from weak to strong), in which case the depth map module 214 achieves the indexing of the pattern features. In alternative examples, squares of differing intensity can also be used, and the depth map module 214 similarly achieves the indexing of the pattern features.

As another example, the depth map module 214 may use two intensity variations of pattern features. The two intensity variations may be cyclical, and the cyclical intensity variations can be generated, e.g., based on available gray levels that can be set for individual pixels of the object in the captured image, as a cost-saving alternative. As long as the two cyclical variations are out of phase (not in phase), the depth map module 214 can obtain a combined cycle that is relatively larger than individual cycles of the two cyclical variations when considered alone.

In yet another embodiment, the depth map module 214 uses two or more distinctive intensity variations to calculate the depth map of the object in the captured image. An illumination pattern having one, two or more distinctive intensity variations may be projected. Each variation may have a unique intensity alternation function throughout the space of a VR headset. For example, the pattern may comprise, as pattern features, continuous stripes with Gaussian shaped intensity hotspots along each stripe. While the stripe intensity degrades linearly while moving in the direction from the sensor to the illuminated object, the intensity measured by the camera at the peak of each hotspot remains constant. The depth information (e.g., distance to an object that reflects the illumination pattern back to the sensor) may be extracted by a comparison of the hotspot intensity to the stripe intensity around it.

In some embodiments, the depth map module 214 further calculates a ratio between hotspot intensity and line intensity to provide supplemental depth map calculation based on stripe shifting as described above. The hotspot intensity and the line intensity provide at least two variations for deriving absolute indexing of the pattern features rendered on the captured image. For example, the pattern features rendered on the captured image may be made up of parallel stripes. The parallel stripes may vary in their base intensity, e.g., in a cycle, to give a variation in a first direction, such as a direction orthogonal to the parallel stripes. The stripes themselves may carry notations in their lengthwise direction, and the variations are arranged differently on different stripes so that each stripe or each cluster of stripes can be identified and indexed. In one embodiment, the notations carried by the stripes may have a peak intensity or a peak value in terms of intensity that remains constant. All intensities are expected to gradually decrease with an increased distance of the object from the light source and the sensor detecting the object, and the decreased intensity of the stripes captured by the sensor can provide depth information. In some embodiments, absolute brightness of the object in the captured image also depends on the reflecting surface, in which case, multiple factors including the distance between the light source or the sensor and the illuminated object as well as other factors (e.g., properties of the reflecting surface) are considered together for acquiring depth information.

In one embodiment, the depth map module 214 uses a ratio between base intensity of the stripe and the peak intensity of the stripe to allow for more accurate depth calculation, especially when combined with segmentation or triangulation results. In another embodiment, the depth map module 214 identifies different intensities and different notation distributions on each stripe or specific sectors of a single stripe, which also allows for more accurate depth map calculation. In some embodiments, the notations described above may be constructed from Gaussian brightness distributions for ease of use.

The reflectivity map module 216 of the processor 200 generates reflectivity map representation of the object in the captured image stored in the image data store 232. As described above, a reflectivity map representation of an object refers to an image containing information about reflectivity characteristics of different parts of the surface of the object in the captured image, and a reflectivity map representation of an object provides surface details (fine-scale details of visually distinguished points on the surface of the object). In one embodiment, the reflectivity map module 216 derives a reflectivity map of the object in order to represent a more uniform illumination of the object in the captured image by processing the inherently non-uniform illumination of the object that resulted from the structured light projected onto the object. An example reflectivity map representation is shown in FIG. 5. The created reflectivity map representation and related data is stored in the reflectivity map data store 236.

In one embodiment, the reflectivity map module 216 creates a reflectivity map representation of the same object in the captured image, from which the depth map representation of the object is generated by the depth map module 214. In yet another embodiment, the reflectivity map module 216 may create a reflectivity map of a captured image of the object, which is different from the captured image of the object from which the depth map representation is created. In this embodiment, the two different captured images may include the same object or scene but from different perspectives.

In some embodiments, the reflectivity map module 216 may derive a reflectivity map representation for specific regions of the illuminated object such as the regions with fine surface details for generating the reflectivity map representation of the object. For example, for an object including the front face of a person, skin regions of the face include rich information about surface details as well as information for diffusion of patterned illumination into non-illuminated regions (i.e., regions between illumination pattern features). In this example, the reflectivity map module 216 may derive reflectivity map representation for skin regions that provides rich surface information.

To generate a reflectivity map representation of the object in the captured image, the reflectivity map module 216 first indexes the pattern features projected onto the illuminated object and rendered in the captured image of the object. An example of indexing of pattern features in a captured image is more fully described below with reference to FIG. 3. The reflectivity map module 216 applies the indexing to correlate features of illumination patterns provided by the illuminator with pattern features rendered in the captured images. The correlation further enables calculation of the functional behavior of the pattern features projected on the surface of the illuminated object in the captured image. The functional behavior of pattern features can be represented by one or more features associated with the pattern features rendered in the captured image like captured intensity along a predefined line. An example of functional behavior is illustrated in FIG. 6A, as more fully described below. From the functional behavior of the pattern features, the reflectivity map module 216 may calculate the actual surface reflectivity of the illuminated object by removing the pattern features from the captured image of the object. Examples of removing the pattern features based on the functional behavior of the pattern features are shown in FIG. 6A and FIG. 6B.

In some embodiments, the reflectivity map module 216 may improve a generated reflectivity map representation of an object with additional illumination provided by an additional illuminator to optimize the illumination pattern. The additional illumination can be used to illuminate regions of the object that are located between pattern features. For example, for pattern features being stripes in one dimension, the regions to be illuminated by the additional illumination are dark regions between bright stripes. Such illumination can improve derivation of a reflectivity map. In some embodiments, the illumination pattern may also be modified to introduce some background illumination and/or wider feature dimensions to provide wider surface illumination under some acceptable optimization constraints such as tradeoff between acceptable degradation of depth map representation of the object and improved reflectivity map representation of the object.

The 3D representation module 218 of the processor 200 generates a 3D representation of the object in the captured image based on the created depth map representation of the object and the reflectivity map representation of the object in the captured image. In one embodiment, the 3D representation module 218 combines the reflectivity map representation of the object and the depth map representation of the object to generate the 3D representation of the object. The 3D representation of the object includes both surface details and depth information of the object. The generated 3D representation and related data are stored in the 3D representation data store 238.

In some embodiments, the 3D representation module 218 may use one or more additional images of the captured object to enhance the 3D representation of the object. Taken one additional image as an example, to enhance the 3D representation, the 3D representation module 218 retrieves the created reflectivity map representation of the object from the reflectivity map data store 236 and the created depth map representation of the object from the 3D representation data store 238. The 3D representation module 218 uses the reflectivity map representation of the object to register the additional image onto the extracted depth map representation and correlates surface information of the additional image with the surface information already included in the 3D representation. The 3D representation module 218 derives additional 3D information of the object by comparing the reflectivity map representation of the object and the additional image of the object, adds the derived 3D information to enhance the depth map representation and further to yield a further enhanced 3D representation.

The image data store 232 of the processor 200 stores captured images of specific objects or scenes and image data related to the captured images. In one embodiment, the captured images stored in the image data store 232 can be images of a same object or a same scene. In this embodiment, the captured images may also vary in terms of illumination patterns provided by one or more illuminators. For example, as described above, the captured image may be an image of the same object or scene but with additional illumination, which is used to improve construction of the reflectivity map representation. In another embodiment, the captured images stored in the image data store 232 may include images of different objects or different scenes with the same or different illumination patterns. The image data store 232 also stores additional images captured by an additional sensor and image data related to the additional image.

The depth map data store 234 of the processor 200 stores depth map representations and related data of an object generated by the depth map module 214. For example, the depth map data store 234 stores the original depth map representation and related depth data as well as enhanced depth map representation and related depth data. As described above, the original depth map representation refers to the depth map representation that is derived from the original captured image without the additional image, while the enhanced depth map representation refers to the depth map representation that is enhanced with the additional image and additional 3D data.

The reflectivity map data store 236 of the processor 200 stores reflectivity map representations and related data of an object generated by the reflectivity map module 216. For example, the reflectivity map data store 236 stores the original reflectivity map representation and related reflectivity data as well as improved reflectivity map representation and related reflectivity data. As described above, the original reflectivity map representation refers to the reflectivity map representation that is derived from the original captured image without the additional illumination, while the improved reflectivity map representation refers to the reflectivity map representation that is improved with the additional illumination. The reflectivity map representations and related reflectivity data provides reflectivity characteristics of the surface of the object in the captured image.

The 3D representation data store 238 of the processor 200 stores 3D representation and related data of an object generated by the 3D representation module 218. For example, the 3D representation data store 238 stores original 3D representation and related 3D data as well as enhanced 3D representation and related 3D data. As described above, the original 3D representation refers to the 3D representation that is derived from the reflectivity map representation and the depth map representation without the additional image nor the enhanced depth map representation, while the enhanced 3D representation refers to the 3D representation generated with the additional image and further with the additional 3D data and the enhanced depth map representation.

Figure 2B:
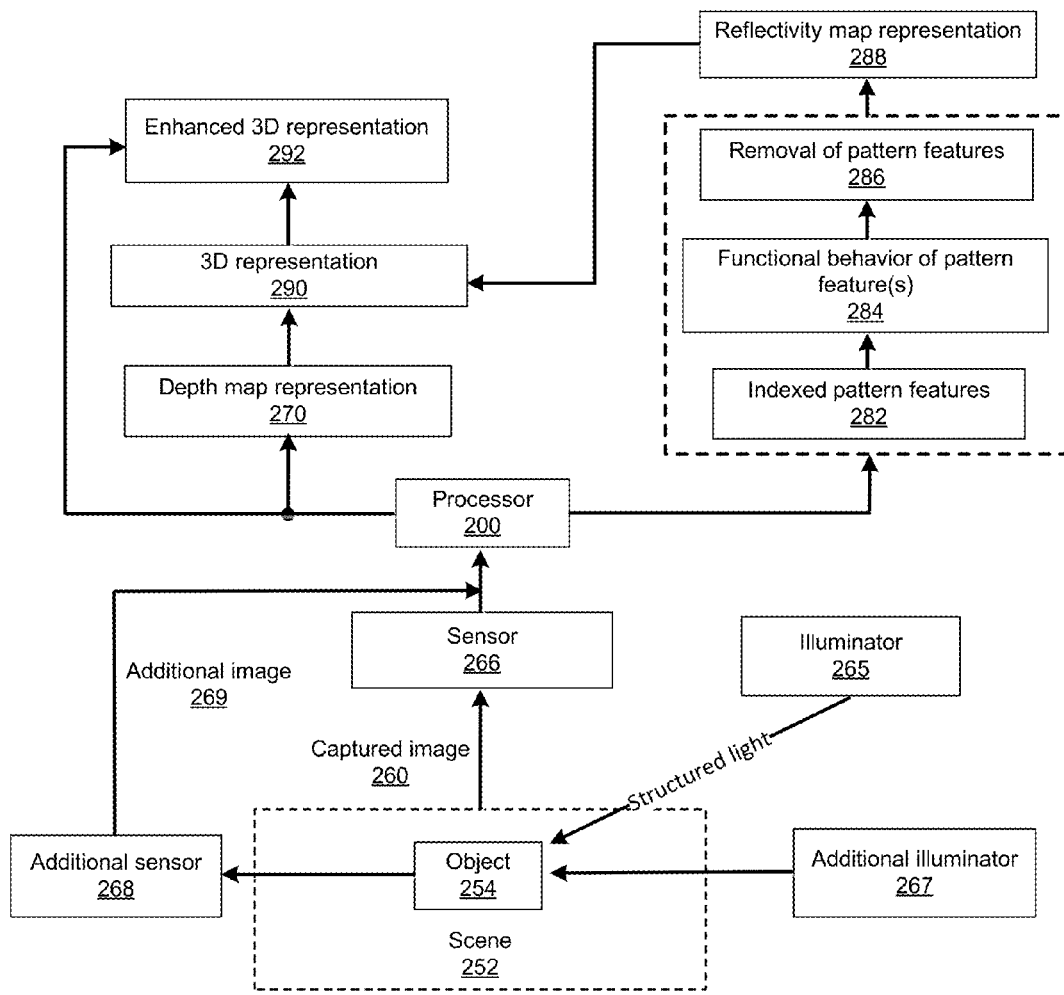
FIG. 2B is a flow diagram illustrating steps of capturing an image of an object in a scene and augmenting a depth map representation of the object with a reflectivity map representation of the object, according to one embodiment.

FIG. 2B is a flow diagram 250 illustrating steps of capturing an image 260 of an object 254 in a scene 252 and augmenting a depth map representation 270 of the object 254 with a reflectivity map representation 288 of the object, according to one embodiment. As shown in FIG. 2B, an illuminator 265 provides structured light with a specific illumination pattern (e.g., strips) to the object 254 in the scene 252 and a sensor 266 captures an image of the object 254 in the scene 252. In one embodiment, a processor 200 may instruct the illuminator 265 to illuminate the object 254 with specific structured light. The captured image 260 is provided to the processor 200 to generate a depth map representation 270 of the object 254 and a reflectivity map representation 288 of the object 254. To generate the reflectivity map representation 288 of the object 254, the processor 200 first derives indexed pattern features 282 by indexing the pattern features rendered in the captured image 260. The processor 200 then derives functional behavior of at least one pattern feature 284 by analyzing the indexed pattern features in the captured image 260. The processor 200 generates a reflectivity map representation 288 of the object 254 with the removal 286 of the pattern features from the captured image 260 based on the derived functional behavior of the pattern features. The processor 200 combines the depth map representation 270 of the object 254 and the reflectivity map representation 288 of the object 254 to create a 3D representation 290 of the object 254.

In one embodiment, as shown in FIG. 2B, an additional illuminator 267 may provide structured light with additional illumination to the object 254 in the scene 252 to improve the construction of the reflectivity map representation 288, as described above in FIG. 2A. An additional sensor 268 may capture an additional image 269 of the object 254 in the scene 252, and the processor 200 instructs the reflectivity map representation 288 to register the additional image onto the depth map representation 270 to generate an enhanced 3D representation 292, as described above in FIG. 2A.

FIG. 3 is an example captured image 300 of an object 354 that is illuminated by structured light with a specific illumination pattern 320, according to one embodiment. As shown in FIG. 3, the object 354 in the captured image 300 is a person with the front face, neck and shoulders being illuminated by the structured light with the illumination pattern 320. The captured image 300 shows that the pattern features 322 rendered on the front face (i.e., 322A) and on the shoulders (i.e., 322B) of the object 354 are linear stripes in one direction (horizontal direction) with difference intensities, where each individual stripe with certain intensity is a pattern feature. The captured image 300 also shows indexing 342 of the pattern features 322 and the derived functional behavior 344 of the pattern features. For example, each of the pattern features (e.g., horizontal stripes with varying intensities) 322 is indexed shown by an arrow according to feature characteristics (e.g., intensity) of each pattern feature. A "feature characteristic" refers to a characteristic of a specific type of pattern features that can be used to distinguish the individual pattern features. In this example, the feature characteristic is the intensity that is used to distinguish each pattern feature (e.g., each horizontal stripe) since the intensity of individual stripes separates them from each other with the dark intervals between two adjacent bright stripes, which allows indexing of the individual pattern features. In alternative examples not shown, a different type of feature characteristic may be applied to help index a corresponding type of pattern features. For example, shape (e.g., line width) and color can be other feature characteristics of other types of pattern features. Additionally, a different object illuminated with a different type of illumination pattern may be captured, and the captured image may render a different type of pattern features and corresponding feature characteristics are used to the index the pattern features.

The functional behavior 344 of the pattern features 322 in different parts of the object can be different. For example, the pattern features 322A on the skin regions (e.g., on the face or on the neck) appear more diffusive than the pattern features 322B on the clothes region (e.g., on the shoulder). The pattern features 322B on the clothes also appear more spread, and the inter-feature gaps 324 are also illuminated due to the diffusion of the illumination through the skin.

The inter-feature gaps 324 described herein refers to the gaps of intensity within a same pattern feature (e.g., within a same horizontal stripe). In some embodiments, the differences between the pattern features 322A on the skin regions and the pattern features 322B on the clothes region may result from differences of texture of the two regions. The differences between pattern features 322A and 322B also show that pattern features 322A on the skin regions are more suitable to derive functional behavior of the pattern features due to better visibility of the pattern features and to further construct a corresponding reflectivity map representation.

FIG. 4 is an example depth map representation 400 of the object 354 in the captured image 300 shown in FIG. 3, according to one embodiment. As shown in FIG. 4, the depth map representation 400 is derived from deformations of target pattern features of the object 354 in the captured image 300. The target patterns features include the pattern features on the skin regions of the person (e.g., on the face or on the neck) in the captured image 300. The deformation of target pattern features includes deformations of the horizontal stripes in the captured image 300. In one embodiment, the deformation of target pattern features is based on a mesh-based model 440, which is interpolated to generate the deformation. The depth map representation 400 of the person includes depth information of the person in the captured image 300, however, it does not have surface information and fine-scale details on the surface of the captured object 354.

FIG. 5 is an example reflectivity map representation 500 of the object 354 in the captured image 300 shown in FIG. 3, according to one embodiment. The reflectivity map representation 500 shown in FIG. 5 includes only the reflectivity information on the surface of the skin regions (e.g., the face and the neck) of the object 354, not including the clothes region of the object 354. The clothes region and the background of the reflectivity map representation 500 are taken from corresponding parts of the captured image 300 shown in FIG. 3. One reason of constructing only the skin regions is that the functional behavior of the pattern features in those regions is more visible, as described above in FIG. 3. Compared with the depth map representation 400 shown in FIG. 4, the reflectivity map representation 500 provides fine-scale details of the surface of the object 354. For example, the reflectivity map representation 500 shows regions of eye brows 522, eyelashes 523, cheeks 524, nostrils 525 and mouth 526 on the face of the object 354, which cannot be seen from the depth map representation 400 shown in FIG. 4.

FIGS. 6A-6C show various aspects of generating a reflectivity map representation of the object 354 in the captured image 300 shown in FIG. 3, according to one embodiment. More specifically, FIG. 6A shows examples of functional behavior 610 of the pattern features of the object 354, removal of pattern features 620, and resulting residual signals 630 of the object 354 in the captured image 300 shown in FIG. 3, according to one embodiment. In the example shown in 610, the functional behavior of the pattern features of the object 354 is represented as captured intensity along a line 612 that is orthogonal to the lengthwise direction of the horizontal stripes rendered on the object 354 in the captured image 300 shown in FIG. 3. The peak value 614 on the line diagram 610 of the functional behavior represents a maximal intensity of a pattern feature (e.g., a bright stripe) on the object 354 in the captured image 300. The valley value 616 represents a minimal intensity among of a pattern feature (e.g., a bright stripe) on the object 354 in the captured image 300.

The example 620 shows removal of the pattern features 622 based on the function behavior of the pattern features 622. The removal of the pattern features 622 from the object 354 yields a residual signal 624 that represents or approximates the reflectivity of the surface of the object 354 (e.g., a person) in the captured image 300. As more fully described below in FIG. 6B, the removal of pattern features may be carried out by a multiplication function 654.

The example 630 of the resulting residual signal shows the residual signal 624 after the pattern features are removed from the capture image 300. The residual signal 624 provides information about reflectivity on the surface of the object 354 in the captured image 300, and is used to construct the reflectivity map representation of the object 354 in the captured image 300.

FIG. 6B shows an illuminated signal 652 of the object 354 in the captured image 300 and a multiplication function 654 that is used to remove the pattern features on the surface of the object 354 in the captured image 300. In more detail, the multiplication function 654 is derived from the illuminated signal 652 and is used, in a corresponding two dimensional form, to multiply captured image to generate a reflectivity map representation of the object 354.

FIG. 6C shows another example 670 of an original signal 672, a multiplication function 674, and an illumination model 676.

FIG. 7 is a flow diagram 700 illustrating generation of a 3D representation 750 of the object 354 shown in FIG. 3 by combining the depth map representation 400 of the object shown in FIG. 4 and the reflectivity map representation 500 of the object shown in FIG. 5, according to one embodiment. As shown in FIG. 7, the captured image 300 renders pattern features on the captured object 354 (e.g., a person). The depth map representation 400 of the object and the reflectivity map representation 500 are derived from the captured image 300 of the object, where the depth map representation 400 of the object provides depth information of the object while the reflectivity map representation 500 provides reflectivity information of the surface of the object. The 3D representation 750 is created by combining the depth map representation 400 of the object and the reflectivity map representation 500 of the object. The actual 3D effect of the generated 3D representation 750 can be seen stereoscopically, for example, by using a VR device such as the VR headset 140 shown in FIG. 1.

FIG. 8A shows an example of effect of relative positions between pattern features and pixels of an object in an image capturing the object, according to one embodiment. In FIG. 8A, the line diagram 810 shows that the pattern features are centered along pixel centers of the object in the captured image. The line diagram 820 shows a correction module that is applied to remove the pattern features according to their functional behavior, and the line diagram 830 shows complete removal of the pattern features.

FIG. 8B shows another example of effect of relative positions between pattern features and pixels of an object in an image capturing the object, according to one embodiment. In FIG. 8B, the line diagram 860 shows that pattern features are not centered along pixel centers of the object in the captured image. The line diagram 870 shows a correction module that is applied to remove pattern features according to their functional behavior, and the line diagram 880 shows the removal of pattern features is not complete due to shifted pattern features.

In some embodiments, for the pattern features that are not centered along the pixel centers of the object in the captured image, the shifts of pattern features with respect to the pixel centers of the object may be corrected with a sub-resolution correction and a corrected reflectivity map representation may be generated with such correction. The correction for shifts of the pattern features with respect to pixel centers may involve tracking light distribution over neighboring pixels and mapping the overall distribution pattern over multiple pixels in two or three dimensions to a spot on a single pixel that is smaller than the pixel size. More details about sub-resolution correction can be found in U.S. patent application Ser. No. 14/595,369.

FIG. 9A is an example flowchart 900 illustrating a process of generating by the processor 200 a 3D representation of an object in an image capturing the object by augmenting a depth map representation of an object with a reflectivity map representation of the object, according to one embodiment. Initially, the object in a scene is illuminated 910 with structured light by an illuminator (e.g., the illuminator 265 in FIG. 2B), and an image of the illuminated object is captured by an image sensor (e.g., the sensor 266 in FIG. 2B). As described above, the captured image renders pattern features that result from the illumination patterns provided by the structured light. The processor 200 analyzes 930 the pattern features in the captured image. The processor 200 creates 940 a depth map representation of the object from the captured image based on the analyzed pattern features. The processor 200 also creates 950 a reflectivity map representation of the object from the captured image based on the analyzed features.

To create a reflectivity map representation of the object, the processor 200 first indexes 952 the pattern features across the object shown in the captured image, and then derives 954 a functional behavior of the pattern feature(s) on the surface of the object. After deriving the functional behavior, the processor 200 removes 956 pattern features from the captured image to create the reflectivity map representation of the object.

After both the depth map representation and the reflectivity map representation are created, the processor 200 generates 960 a 3D representation of the object by combining the depth map representation and the reflectivity map representation of the object. The processor 200 further generates 970 an enhanced 3D representation of the object with one or more additional images of the object and additional illumination.

FIG. 9B is an example flowchart illustrating a process of generating an enhanced 3D representation based on the process shown in FIG. 9A, according to one embodiment. As shown in FIG. 9B, the additional illuminator provides 971 additional illumination to the object to improve construction of the reflectivity map representation. One or more additional images of the object in the scene are captured 972. The processor 200 registers 973 the additional images onto the depth map representation of the object with the improved reflectivity map representation by the additional illumination. The processor 200 derives 974 additional 3D data on the object based on the registered additional image. The processor 200 generates 975 an enhanced 3D representation of the object based on the additional 3D data and the improved reflectivity map representation.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   illuminating an object in a scene with structured light of an illumination pattern;
   capturing an image of the object, the image of the object having a plurality of pattern features according to the illumination pattern;
   analyzing at least one pattern feature in the captured image of the object;
   generating a depth map representation of the object based on the analysis of the at least one pattern feature of the captured image, the depth map representation of the object comprising information describing distance of the object relative to a viewpoint when capturing the image of the object;
   generating a reflectivity map representation from the captured image of the object, the reflectivity map representation of the object comprising information describing reflectivity characteristics of at least a portion of the object, wherein generating the reflectivity map representation of the object comprises:
      indexing the at least one pattern feature projected onto the object in the captured image,
      deriving functional behavior of the at least one indexed pattern feature, and
      removing the at least one pattern feature from the captured image of the object based on the derived functional behavior of the at least one pattern feature;
   combining the depth map representation of the object and the reflectivity map representation of the object; and
   generating a three dimensional (3D) representation of the object based on the combination of the depth map representation of the object and the reflectivity map representation of the object.

2. The method of claim 1, wherein indexing the at least one pattern feature comprises:
labeling the at least one pattern feature based on feature characteristics of the at least one pattern feature, the feature characteristics including at least one of intensity, shape, size or color of the at least one pattern feature.

3. The method of claim 1, wherein the functional behavior of the at least one pattern feature is represented by intensity of the at least one pattern feature along a predetermined direction.

4. The method of claim 1, wherein removing the at least one pattern feature comprises:
applying an multiplication function to the at least one pattern feature; and
removing the at least one pattern feature based on the application of the multiplication function.

5. The method of claim 1, wherein removing the at least one pattern feature comprises:
determining positions of the at least one pattern feature with respect to centers of pixels of the object in the captured image; and
correcting the positions of the at least one pattern feature with respect to the centers of the pixels of the object, wherein the at least one pattern feature is removed from the captured image of the object after the correction.

6. The method of claim 1, further comprising:
providing additional illumination to the object; and
improving the reflectivity map representation of the object with the additional illumination to the object, the improved reflectivity map representation of the object providing additional information describing reflectivity characteristics of at least a portion of a surface of the object.

7. The method of claim 1, further comprising generating an enhanced 3D representation of the object, wherein generating the enhanced 3D representation of the object comprises:
capturing one or more additional images of the object;
registering the one or more additional images onto the depth map representation of the object with the reflectivity map representation;
deriving additional 3D data from the one or more additional images; and
generating an enhanced 3D representation of the object with the additional 3D data.

8. The method of claim 7, further comprising:
generating the enhanced 3D representation of the object with an improved reflectivity map representation of the object.

9. The method of claim 1, wherein the pattern features are stripes with different intensities, adjacent two stripes being separated by a dark interval.

10. A non-transitory computer readable storage medium storing computer program instructions, the computer program instructions when executed by a computer processor causes the processor to perform the steps of:
illuminating an object in a scene with structured light of an illumination pattern;
capturing an image of the object, the image of the object having a plurality of pattern features according to the illumination pattern;
analyzing at least one pattern feature in the captured image of the object;
generating a depth map representation of the object based on the analysis of the at least one pattern feature of the captured image, the depth map representation of the object comprising information describing distance of the object relative to a viewpoint when capturing the image of the object;
generating a reflectivity map representation from the captured image of the object, the reflectivity map representation of the object comprising information describing reflectivity characteristics of at least a portion of the object, wherein generating the reflectivity map representation of the object comprises:
indexing the at least one pattern feature projected onto the object in the captured image,
deriving functional behavior of the at least one indexed pattern feature, and
removing the at least one pattern feature from the captured image of the object based on the derived functional behavior of the at least one pattern feature;
combining the depth map representation of the object and the reflectivity map representation of the object; and
generating a three dimensional (3D) representation of the object based on the combination of the depth map representation of the object and the reflectivity map representation of the object.

11. The non-transitory computer readable storage medium of claim 10, wherein indexing the at least one pattern feature comprises:
labeling the at least one pattern feature based on feature characteristics of the at least one pattern feature, the feature characteristics including at least one of intensity, shape, size or color of the at least one pattern feature.

12. The non-transitory computer readable storage medium of claim 10, wherein the functional behavior of the at least one pattern feature is represented by intensity of the at least one pattern feature along a predetermined direction.

13. The non-transitory computer readable storage medium of claim 10, wherein removing the at least one pattern feature comprises:
applying an multiplication function to the at least one pattern feature; and
removing the at least one pattern feature based on the application of the multiplication function.

14. The non-transitory computer readable storage medium of claim 10, wherein removing the at least one pattern feature comprises:
determining positions of the at least one pattern feature with respect to centers of pixels of the object in the captured image; and
correcting the positions of the at least one pattern feature with respect to the centers of the pixels of the object, wherein the at least one pattern feature is removed from the captured image of the object after the correction.

15. The non-transitory computer readable storage medium of claim 10, further comprising:
providing additional illumination to the object; and
improving the reflectivity map representation of the object with the additional illumination to the object, the improved reflectivity map representation of the object providing additional information describing reflectivity characteristics of at least a portion of a surface of the object.

16. The non-transitory computer readable storage medium of claim 10, further comprising generating an enhanced 3D representation of the object, wherein generating the enhanced 3D representation of the object comprises:
  capturing one or more additional images of the object;
  registering the one or more additional images onto the depth map representation of the object with the reflectivity map representation;
  deriving additional 3D data from the one or more additional images; and
  generating an enhanced 3D representation of the object with the additional 3D data.

17. The non-transitory computer readable storage medium of claim 16, further comprising:
  generating the enhanced 3D representation of the object with an improved reflectivity map representation of the object.

18. The non-transitory computer readable storage medium of claim 10, wherein the pattern features are stripes with different intensities, adjacent two stripes being separated by a dark interval.

19. A non-transitory computer readable storage medium storing computer program instructions, the computer program instructions when executed by a computer processor causes the processor to perform the steps of:
  illuminating an object in a scene with structured light of an illumination pattern;
  capturing an image of the object, the image of the object having a plurality of pattern features according to the illumination pattern;
  analyzing at least one pattern feature in the captured image of the object;
  generating a depth map representation of the object based on the analysis of the at least one pattern feature of the captured image, the depth map representation of the object comprising information describing distance of the object relative to a viewpoint when capturing the image of the object;
  generating a reflectivity map representation from the captured image of the object, the reflectivity map representation of the object comprising information describing reflectivity characteristics of at least a portion of the object;
  providing additional illumination to the object;
  improving the reflectivity map representation of the object with the additional illumination to the object, the improved reflectivity map representation of the object providing additional information describing reflectivity of one or more portions of a surface of the object;
  combining the depth map representation of the object and the improved reflectivity map representation of the object; and
  generating a three dimensional (3D) representation of the object based on the combination of the depth map representation of the object and the improved reflectivity map representation of the object.

20. A non-transitory computer readable storage medium storing computer program instructions, the computer program instructions when executed by a computer processor causes the processor to perform the steps of:
  illuminating an object in a scene with structured light of an illumination pattern;
  capturing an image of the object, the image of the object having a plurality of pattern features according to the illumination pattern;
  analyzing at least one pattern feature in the captured image of the object;
  generating a depth map representation of the object based on the analysis of the at least one pattern feature of the captured image, the depth map representation of the object comprising information describing distance of the object relative to a viewpoint when capturing the image of the object;
  generating a reflectivity map representation from the captured image of the object, the reflectivity map representation of the object comprising information describing reflectivity characteristics of at least a portion of the object;
  providing additional illumination to the object;
  improving the reflectivity map representation of the object with the additional illumination to the object, the improved reflectivity map representation of the object providing additional information describing reflectivity of one or more portions of a surface of the object;
  combining the depth map representation of the object and the improved reflectivity map representation of the object;
  generating a three dimensional (3D) representation of the object based on the combination of the depth map representation of the object and the improved reflectivity map representation of the object; and
  generating an enhanced 3D representation of the object, wherein generating the enhanced 3D representation of the object comprises:
  capturing one or more additional images of the object,
  registering the one or more additional images onto the depth map representation of the object with the reflectivity map representation,
  deriving additional 3D data from the one or more additional images, and
  generating the enhanced 3D representation of the object with the additional 3D data.

* * * * *